Sept. 9, 1969      N. R. BALZER      3,466,414
INDUCTOR FOR HEATING A MOVING WORKPIECE
Filed Jan. 31, 1967
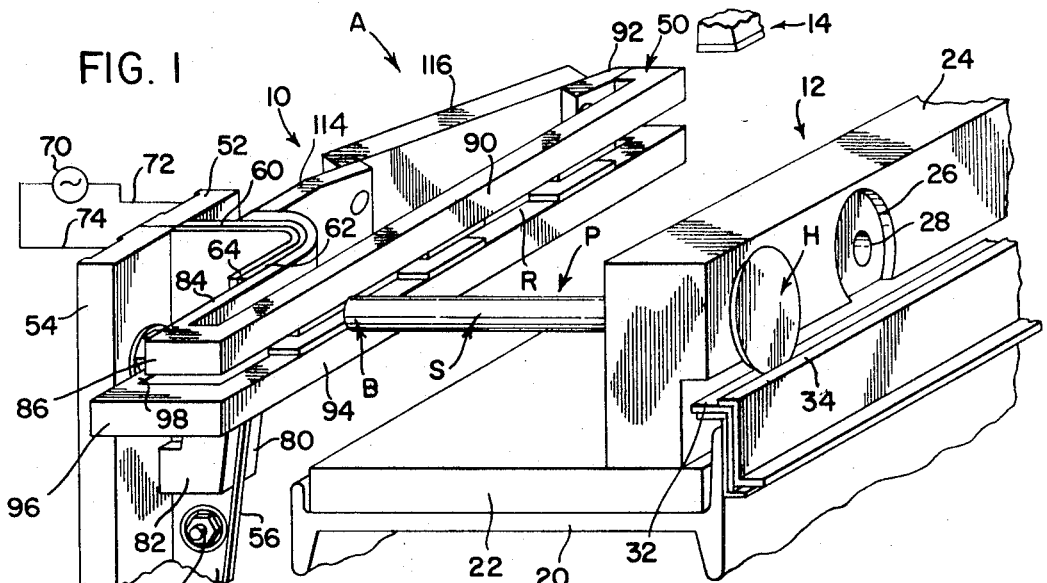
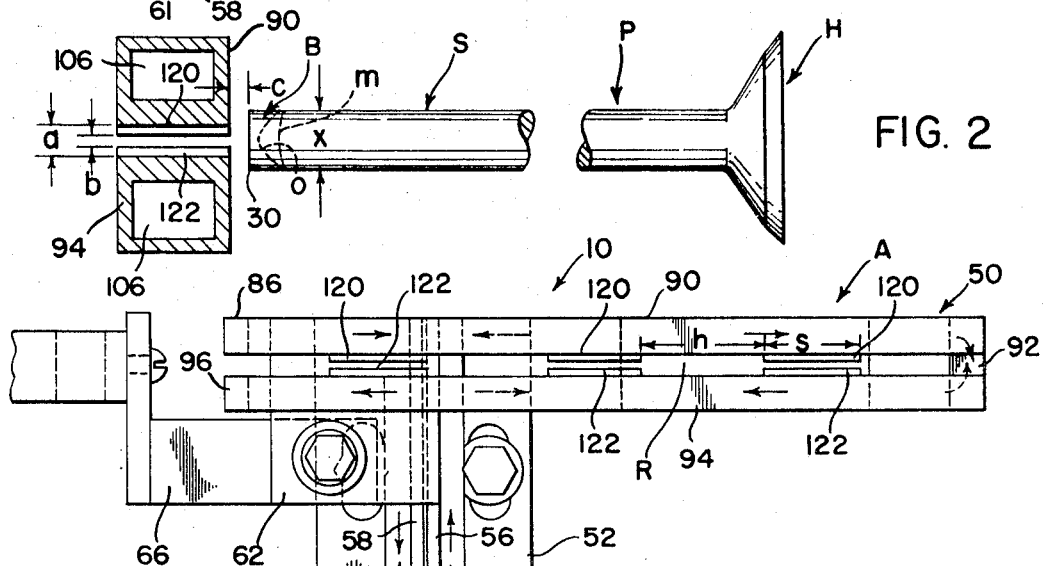
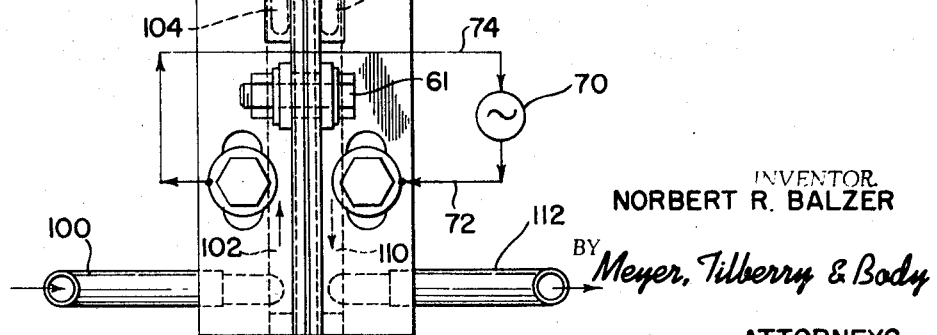
INVENTOR.
NORBERT R. BALZER
BY Meyer, Tilberry & Body
ATTORNEYS

United States Patent Office 3,466,414
Patented Sept. 9, 1969

3,466,414
INDUCTOR FOR HEATING A MOVING WORKPIECE
Norbert R. Balzer, Parma, Ohio, assignor to Park-Ohio Industries, Inc., a corporation of Ohio
Filed Jan. 31, 1967, Ser. No. 612,907
Int. Cl. H05b 5/00, 9/00
U.S. Cl. 219—10.43                                10 Claims

ABSTRACT OF THE DISCLOSURE

The tip of an elongated workpiece is inductively heated by moving it along an inductor having spaced, parallel conductors with a plurality of spaced copper inserts between the conductors. The inserts cause the tip to be heated by successive heating steps, with little heating between the steps, so that the tip is heated to a more uniform depth before it is quench hardened.

---

The present invention pertains to the art of induction heating and, more particularly, to an improved inductor for heating a moving workpiece.

The invention is particularly adapted for heating the tip of a poppet valve, such as that used in an internal combustion engine, before the tip is quench hardened to provide a wear resistant end surface, and it will be described with particular reference thereto; however, it should be appreciated that the invention has much broader applications and may be used to heat other moving workpieces, especially elongated workpieces where only one tip, or end, is to be heated before being quench hardened.

A poppet valve includes an enlarged head, a stem, and a lower tip. During operation of such a valve, a metal cam usually contacts the tip to move the valve axially; therefore, it is necessary, when producing a poppet valve, to harden the tip of the stem to prevent rapid wear by the cam. This has been done by a variety of apparatus; however, these apparatus have not been completely successful. Often they required a relatively long process time or a non-uniform hardness pattern resulted in the tip of the valve. In addition, it has been found that, for long life, the tip should be provided with a hardness pattern having a uniform axial depth and a distinct line of demarcation between the hardened area and the unhardened area of the tip. This hardness pattern has been somewhat difficult to obtain without sacrificing the level of hardness on the surface of the tip.

If the prior apparatus heated the tip rapidly and then quenched the tip, the outer cylindrical surface of the tip and the bottom surface of the tip were hardened to substantially the same depth. This produced a shell-like hardness pattern. In other words, the depth of the hardness pattern at the center of the lower tip surface was less than the depth of hardness at the outer portion of this lower surface. If the heating time was increased to allow conduction of heat to the interior of the tip or stem, the hardness pattern of the tip was more acceptable; however, the hardness level was generally quite low. These factors resulted in a heating process which was a compromise between the process to provide the best surface hardness and a process to provide the best hardness pattern.

These disadvantages of the prior apparatus for heating the tip of a poppet valve have been completely overcome by the present invention which relates to an induction heating apparatus for heating the tip of a poppet valve, or a similar workpiece, with the necessary surface hardness and hardness pattern.

In accordance with the present invention, there is provided an apparatus for hardening the tip of an elongated workpiece having a longitudinal axis. This apparatus comprises means for rotating the workpiece about the axis, means for moving the rotating workpiece so that the tip follows a given path, an induction heating means for creating a number of spaced induction heating zones along the path for successively heating the tip, and means for quenching the heated tip.

By hardening the tip of the poppet valve, or the tip of another elongated workpiece, with the above defined apparatus, the successive, rapid, heating operations allow the heat energy to soak into the interior of the tip without over or under heating the surface. Quenching then produces a hardness pattern which has a relatively uniform depth across the bottom surface of the tip and the surface hardness of the tip is within the optimum range.

In accordance with another aspect of the present invention, there is provided an improvement in an inductor for inductively heating a workpiece moving relative to the inductor and along a given path. The inductor includes two elongated, generally parallel conductors arranged to have simultaneously current flow in opposite directions. The conductors extend generally parallel to the given path and have a space therebetween, and the workpiece is movable in spaced relationship with the conductors. In accordance with the present invention, the above-described inductor is improved by providing a plurality of highly conductive elements within the space between the conductors, each of these elements is electrically isolated from at least one of the conductors and the elements are spaced along the conductors to define non-heating portions along the path and adjacent the elements. The elements are offset from the workpiece path so that they do not interfere with the movement of the workpiece along the aforementioned path.

The primary object of the present invention is the provision of an apparatus for hardening the tip of an elongated workpiece, which apparatus produces a hardness pattern having a generally uniform depth from the end of the workpiece and a relatively high surface hardness.

Another object of the present invention is the provision of an apparatus for hardening the tip of an elongated workpiece, which apparatus produces a hardness pattern having a generally uniform depth from the end of the workpiece and a relatively high surface hardness by heating the tip with successive induction heating steps with non-heating steps therebetween and then quench hardening the heated tip.

Another object of the present invention is the provision of an improved inductor having spaced, parallel, conductors with inserts therebetween to divide the conductors into successive heating and non-heating zones.

These and other objects and advantages will become apparent from the following description used to illustrate the preferred embodiment of the invention as read in connection with the accompanying drawing in which:

FIGURE 1 is a pictorial view illustrating, somewhat schematically, the preferred embodiment of the present invention;

FIGURE 2 is an enlarged, partial view illustrating the operating characteristics of the present invention; and, FIGURE 3 is an enlarged front elevational view of a portion of the preferred embodiment as illustrated in FIGURE 1.

Referring now to the drawing wherein the showings are for the purpose of illustrating a preferred embodiment of the invention only and not for the purpose of limiting same, the figures illustrate an apparatus A for hardening the tip B of an internal combustion poppet valve P having an enlarged head H and a stem S. In accordance with the invention, apparatus A includes an induction heating device 10, a valve rotating and moving mechanism 12, and a quenching device 14.

Referring first to the valve rotating and moving mechanism 12, this mechanism includes a support frame 20 having an upper bearing plate 22 and a movable support block 24 having spaced recesses 26 with bores 28 therein. This block is mounted to slide on the upper surface of bearing plate 22. Poppet valves P are inserted through the bore 28 so the valves may rotate about their longitudinal axes and tips B move along a predetermined path 30, as designated in FIGURE 2. At the rear of block 24 there is provided a rotating plate 32 which contacts the outer periphery of head H and rotates valves P in bores 28 when block 24 slides along plate 22. The outermost surface of tip B is maintained in path 30 by a rear locator plate 34 which may frictionally engage the upper surface of head H to assist rotation of the valves as the block 24 is moved. Of course, an appropriate mechanism is provided for moving block 24, and the block is guided by any well-known arrangement. In practice, the block 24 is a continuous conveyor so that a number of valves may be moved along the induction heating device 10 in rapid succession.

Referring now to the induction heating device 10, this device includes an inductor 50 which forms an essential element of the present invention. The customary bus bars 52, 54 include tapered support plates 56, 58 which are separated by an appropriate insulation layer 60 and held together by insulated bolts 61. The support plates terminate in upper bent support arms 62, 64. A reinforcing bracket 66 is secured to a structural element, not shown, and to the bent arms 62, 64 to rigidify the heating device 10. An appropriate supply of alternating current, schematically represented as a generator 70 is connected to the bus bars 52, 54 by leads 72, 74, respectively.

The inductor 50 includes downwardly extending legs 82, 84 which are secured onto the respective bus bars. Leg 80 is, in turn, connected onto a top rear leg 84 which is also electrically connected with bent arm 62. An end connector 86 joins leg 84 with the top heating conductor 90, and another end connector 92 attaches one end of conductor 90 with the bottom heating conductor 94. The electrical circuit trough the inductor 50 is completed by an end connector 96 and a bottom rear leg 98 attached onto the leg 82. As so far described, inductor 50 includes two spaced, parallel, heating conductors 90, 94 which are separated by a space bar. The conductors are parallel to the path 30 which is followed by the tips B of valves P so that the conductors are adapted to heat the tips before they are quench hardened by quenching device 14.

The inductor 50 is provided with an internal cooling system which may take a variety of structural forms; however, in accordance with the illustrated embodiment of the present invention, this system includes an input 100 communicated with a bus bar passage 102. The branch 104 joins the bus bar passage with the internal inductor passage 106. This passage follows the inductor through the various portions thereof. Coolant from the inductor passes into a branch passage 108 which is communicated with a second bus bar passage 110. This last-mentioned passage is connected with outlet 112 for establishing coolant flow through the inductor 50. As illustrated in FIGURE 3, the dashed arrows indicate the coolant path through inductor 50, and the solid line arrows indicate the current flow through the inductor. It is appreciated that the alternating current from generator 70 will alternately reverse the current flow directions. The illustrated arrows are only conventional instantaneous designations and show that the currents flowing through the spaced conductors 90, 94 are in opposite directions.

To support the inductor 50, a plate 114 is secured onto top rear leg 84, and an insulated supporting strap 116 connects this plate with end connector 92, as shown in FIGURE 1.

In accordance with the present invention, the plurality of pairs of highly conductive elements 120, 122 are provided in the space R between the conductors 90, 94. These elements are preferably formed from copper and each have a length represented by $s$ in FIGURE 3. The pairs of elements are spaced a distance represented by $h$. As the tip B moves along the conductors 90, 94, it is inductively heated in the areas having no elements. In the areas of the elements, the flux lines around the conductors are concentrated between the inserts and do not extend outwardly a sufficient distance to affect heating of the workpiece tips. In effect, the tips are alternately heated, inductively, and allowed to soak. This intermediate soaking allows heat energy adjacent the surface of the tips to move inwardly toward the center of the tip. This results in a tip having a relatively uniform heated depth across its end cross-section. Thereafter, device 14 quenches the heated tip and a heating pattern, to be explained later, is obtained.

Referring now to FIGURE 2, the diameter of valve P is represented by $x$. The spacing between conductors 90, 94 is represented by $a$; the spacing between the elements 120, 122 is represented by $b$; and, the spacing of path 30, or the end of tip B, is represented by $c$. If the tip B were moved along the conductors 90, 94 without the elements 120, 122, the flux field created by the conductors would tend to heat the outer cylindrical edge of the tip B. To provide the proper metallurgical characteristics the heating must be done rapidly and there is little time for heat energy to be conducted to the center of the tip; therefore, the heat energy remains adjacent the outer surfaces of the tip. Consequently, when the tip is quench hardened by device 14, a shell-like or hollow pattern, designated $o$ in FIGURE 2, would be obtained. If the heat energy were allowed to soak in after the tip leaves the vicinity of the conductors, subsequent quenching will not provide the necessary surface hardness for the tip. These disadvantages are overcome by the use of elements 120, 122 which provide short periods for the heat energy to soak inwardly by conduction into the center of the tip B as it is moving along the inductor. As the tip is alternately heated and then soaked in rapid succession, a hardness pattern $m$, as shown in FIGURE 2, is obtained without a drastic reduction in the surface hardness of the tip B.

It has been found in practice that the distance $a$ should be substantially greater than the spacing $c$ of the tip from the conductors; however, the distance $b$ should not be substantially greater than $c$. In fact, it has been proven successful to provide the distance $b$ substantially the same as distance $c$. Of course, the distance $c$ is the spacing of the workpiece from the conductors, and this spacing determines the magnetic coupling between the conductors and the tip. It has also been found that the diameter $x$ of the valve should be substantially greater than the spacing $a$ between the conductors. In accordance with the preferred embodiment of the invention, $x$ is approximately twice as large as the spacing $a$. The length $s$ of elements 120, 122 may be varied somewhat between the different pairs of elements; however, in practice these lengths $s$ are approximately 1.0 inch and the lengths $h$ are approximately $11/_{32}$ of an inch. In other words, the ratio of $s:h$ is, in practice, approximately 2:3.

In one particular use of the invention as described above, a valve P having a diameter $x$ of .349–.360 inch was to be heated with an outer hardness of 50 RC with a flat hardness pattern, such as $m$ in FIGURE 2. Twenty-four hundred (2400) of these valves were to be hardened per hour. With the inductor 50 powered by 14.0 kw. and without the elements 120, 122, a hardness pattern such as $o$ in FIGURE 2 was obtained. The power to the inductor was reduced; however, only the outer edges of the tip were heated properly by the inductor. The center portion of the tip was relatively soft after quenching. In other words, when hardening twenty-four hundred (2400) valves per hour in apparatus A, without elements 120, 122, the hardening operation was not successful. By modifying the inductor 50 to include the elements 120, 122 and applying 15.7 kw. to the inductor 50 with a distance $c$ of 1/16 of an inch, a hardness pattern of good martensite was obtained with a center depth of .156" and an outer depth of .165". This is a substantially flat hardness pattern. The distance $c$ was increased to 3/32 of an inch and then 1/8 of an inch with the same power being applied to the inductor 50. It was found that the center of the stem was hardened to 43 RC, 35 RC, respectively. This is below the required 50 RC in the center portion. However, this result was better than that obtained without the elements 120, 122 between the conductors. Another factor which was tested was the effect of a delay before quenching the heated tips. When the distance $c$ was 1/16 of an inch, a delay in quenching did not have substantial effect on the hardness pattern of the good martensite formed by hardening. This particular test indicates the advantage obtained by modifying the inductor 50 with the elements 120, 122.

The present invention has been described in connection with certain structural embodiments; however, changes may be made in these embodiments without departing from the intended spirit and scope of the present invention.

Having thus defined my invention, I claim:

1. In an inductor for inductively heating a workpiece moving relative to said inductor along a given path, said inductor including two elongated, generaly parallel, conductors arranged to have simultaneous current flow in opposite directions, said conductors extending generally parallel to said given path and having a space therebetween, and said workpiece being movable in spaced relationship with said conductors, the improvement comprising: a plurality of highly conductive elements supported on at least one of said conductors within said spaced and in fixed relationship with said conductors, each of said elements being electrically isolated from at least one of said conductors, said elements being spaced along said conductors to define non-heating portions along said path and adjacent said elements, said elements being offset from said workpiece path.

2. The improvement as defined in claim 1 wherein said path is outside said space between said conductors.

3. The improvement as defined in claim 1 wherein said elements are arranged in pairs with one element of each pair attached to the first of said conductors and the other element of each pair being attached to the second of said conductors, said elements in each pair being opposite each other and spaced from each other.

4. The improvement as defined in claim 3 wherein said path is outside said space between said conductors and spaced therefrom a distance $c$.

5. The improvement as defined in claim 4 wherein said conductors are spaced from each other a distance $a$ and said elements of each pair of elements are spaced from each other a distance $b$, with $a$ being substantially greater than $c$ and $b$ being not substantially greater than $c$.

6. The improvement as defined in claim 5 wherein $b$ is substantially equal to $c$.

7. The improvement as defined in claim 5 wherein said workpiece is cylindrical with an axis extending through said space between said conductors and said workpiece has a diameter $x$, with $x$ being substantially greater than $a$.

8. The improvement as defined in claim 7 wherein $x$ is approximately $2a$.

9. An apparatus for hardening the tip of an elongated workpiece having a longitudinal axis, said apparatus comprising: means for rotating said workpiece about said axis; means for moving said rotating workpiece so that said tip follows a given path; and induction heating means for creating a number of spaced induction heating zones along said path for successively heating said tip; and, means for quenching said heated tip, said induction heating means including an inductor with two spaced parallel conductors each of which is spaced slightly from said path, and electrically conductive elements supported on at least one of said conductors between said conductors for defining non-heating zones, each of said elements being spaced from at least one of said conductors.

10. In an inductor apparatus having two elongated generally parallel induction heating conductors arranged to have simultaneous current flow in opposite directions, said conductors defining a heating pass for said inductor, the improvement comprising: highly conductive elements having lengths $s$ in the direction of said pass, said elements being supported on at least one of said conductors and between said conductors and spaced along said conductors, each of said elements being fixed with respect to said conductors and spaced from at least one of said conductors, said elements being spaced by distances $h$ along said conductors having soaking zones with lengths $s$ and heating zones with lengths $h$.

References Cited
UNITED STATES PATENTS

| | | | |
|---|---|---|---|
| 1,821,530 | 9/1931 | Spire | 219—10.69 X |
| 2,598,694 | 6/1952 | Herbenar | 219—10.59 X |
| 3,251,976 | 5/1966 | McBrien | 219—10.43 X |

JOSEPH V. TRUHE, Primary Examiner

L. H. BENDER, Assistant Examiner

U.S. Cl. X.R.

219—10.59, 10.69